United States Patent [19]

Gurney

[11] Patent Number: 4,710,755
[45] Date of Patent: Dec. 1, 1987

[54] ALARM FOR MILK COOLER

[76] Inventor: Robert A. Gurney, R.R.#7, Brighton, Ontario, Canada, K0K 1H0

[21] Appl. No.: 861,972

[22] Filed: May 12, 1986

[51] Int. Cl.[4] .............................................. G08B 21/00
[52] U.S. Cl. .................................. 340/585; 119/14.14; 340/589
[58] Field of Search ............... 340/589, 588, 585, 527, 340/540, 683, 679, 596, 514; 62/126, 130, 185, 201; 119/14.09, 14.14

[56] References Cited

U.S. PATENT DOCUMENTS 3,028,586  7/1959  Reda ..................................... 340/514
4,028,688  6/1977  Goleman ............................. 340/585
4,612,537  9/1986  Maltais et al. ....................... 340/596

Primary Examiner—James L. Rowland
Assistant Examiner—Tat K. Wong
Attorney, Agent, or Firm—Franklin D. Wolffe; Morris Fidelman

[57] ABSTRACT

An alarm for a milk cooler which sounds when the temperature of milk within the cooler exceeds a predetermined value. A switch permits the device to be turned off to prevent it from sounding when milk is being discharged from the cooler or when the cooler is being cleaned with hot cleaning solvent. However when fresh milk is being introduced into the cooler that switch is overridden and the alarm sounds should the milk not be cooled to the required temperature after a predetermined interval of time.

11 Claims, 1 Drawing Figure

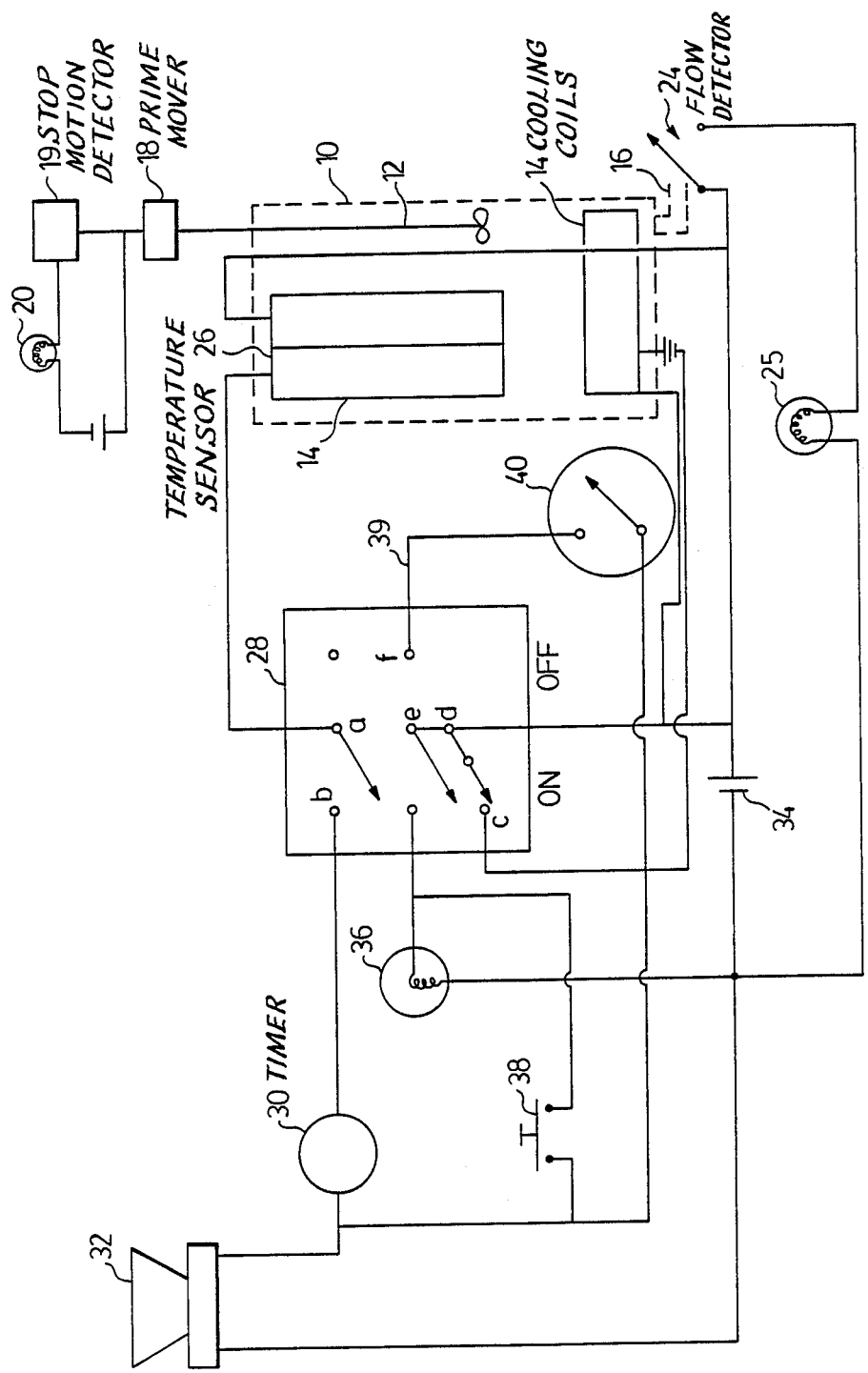

ALARM FOR MILK COOLER

CROSS REFERENCES TO PRIOR ART

U.S. Pat. No. 3,028,586—Temperature Warning System. E. E. Reda issued Apr. 3, 1962.

U.S. Pat. No. 3,753,259—Cooler and Freezer Failure Warning System. Raymond L. Donovan issued Aug. 14, 1973.

U.S. Pat. No. 2,450,450—Supervisory Indicating Circuit. J. Schmidinger issued Oct. 5, 1948.

U.S. Pat. No. 1,636,698—Thermally Controlled Signaling Device. F. C. Leonard et al. issued July 26, 1927.

U.S. Pat. No. 2,190,428—Control and Warning Circuit. H. K. Johnson issued Feb. 13, 1940.

U.S. Pat. No. 3,634,840—High-Temperature Warning System. Bruce L. Wilkinson et al. issued Jan. 11, 1972.

U.S. Pat. No. 4,385,289—Trailer Temperature Sensing Alarm for Refrigerated Trucks. Billy J. McMillan issued May 24, 1983.

BACKGROUND OF THE INVENTION

This invention relates to alarms for milk coolers and more particularly to an alarm which sounds when the temperature of milk within a milk cooler exceeds a predetermined value.

According to conventional practice on a dairy farm, milk is drawn from cows by means of a milking machine and flows through a series of conduits to a cooler where its temperature is reduced to about 4 degrees C. An agitator within the cooler ensures that the temperature is uniform throughout the volume of milk.

The cooler maintains the milk at the required temperature until the milk is discharged onto a tanker truck for transportation to a dairy. Once the milk has been discharged, the cooler is scoured with hot cleaning solvent to make it suitable for the next load of fresh milk.

The milk may remain in the cooler for a matter of hours or days depending on the frequency of pick up by the tanker truck. During this time, the milk must be maintained at the required temperature to preserve its quality. Should the cooler malfunction or cease operating because of an interruption of power, the milk may spoil.

Since a milk cooler may contain one or more days' production of milk on a dairy farm, the spoilage of its contents represents a significant economic loss to the farm. In order to minimize the possibility of spoilage for this reason, warning devices of various constructions have been devised for use in conjunction with milk coolers. Typical of such devices is one which consists of a warning lamp which is illuminated when the cooler is operating normally but which goes out when the cooler ceases functioning.

Such a warning device has many shortcomings the most serious of which being that it requires continuous monitoring to be effective. If a farmer is unable to inspect the warning lamp at frequent intervals it will be of only marginal usefulness to him since it will not tell him that the cooler has stopped working if the cooler stops at a time when he is unable to inspect the lamp.

Another shortcoming of such a warning lamp is that it does not indicate whether the cooler is operating when it contains milk. The cooler may be consuming electricity but not be functioning properly yet the warning lamp will be illuminated and be indicating that nothing is amiss.

A still further shortcoming of the warning lamp is that it fails to warn the farmer that the cooler is not turned on when it should be. For example the farmer may have shut off the cooler to permit him to empty it or clean it with cleaning solvent. The warning lamp lacks means, independent of the farmer, for ensuring positively that the cooler is turned back on after it has been emptied or cleaned. Should therefore, the farmer forget to turn the cooler back on when fresh milk is being introduced into the cooler he will not be warned that the cooler is not operating.

SUMMARY OF THE INVENTION

It is an object of this invention to provide an alarm for a milk cooler which sounds when the temperature of milk within the cooler exceeds a predetermined value. The alarm has means for warning the farmer that the alarm is not activated when fresh milk is being introduced into the cooler.

It is a further object to provide an alarm for a cooler which activates if the temperature of the milk within the cooler exceeds a given value. The alarm also activates if the agitator within the cooler fails to operte or if milk accidently discharges from the cooler.

These and other objects are accomplished by a temperature warning device for use in conjunction with a milking machine and a cooler in which the milking machine causes milk to flow from one or more cows to the cooler where the temperature of the milk is cooled to a predetermined value, said warning device comprising: temperature sensor means responsive to the temperature of milk within the cooler; alarm means activated by said sensor means when the temperature of the milk within the cooler is above a predetermined value; means for selectively de-activating said alarm means; and warning means responsive to activation of said milking machine and to de-activation of said alarm means for warning of de-activation of said alarm means.

DESCRIPTION OF THE DRAWING

The invention is described in detail with reference to the accompanying drawing which shows schematically and in simplified form the temperature warning system of the invention.

DESCRIPTION OF PREFERRED EMBODIMENT

With reference to the drawing, a cooler for milk is indicated generally 10. The cooler is of conventional construction and includes an agitator 12, cooling coils 14 and a discharge outlet 16. The agitator is activated by a prime mover 18 such as an electric motor and a stop motion detector 19 is connected to the agitator and activates a lamp 20 when the agitator is not in motion. A suitable stop motion detector for this purpose is an infra-red sensor, model DS-415, manufactured by Detection Systems of Fairport, N.Y. and a current sensor, model FDAF, manufactured by Potters and Brumfield of Guelph, Ontario. Lamp 20 is preferably mounted on a central control panel (not illustrated).

A flow detector 24 is mounted in the discharge outlet 16 of the cooler. The latter detector may be in the form of a paddle-type flow switch such as that manufactured by GEMS Sensors Division of Transamerica Delaval Inc. and identified by the trade mark GEMS FS-550. The flow switch serves to activate lamp 25 to warn a farmer that milk or other liquid is discharging from the cooler. The lamp is preferable mounted on the central control panel and is preferably in circuit with switch 28, described below. In that way lamp 25 will be deactivated during the time that milk or cleaning solvent are discharging from the cooler.

A temperature sensor 26 is mounted within the cooler and may be in the form of a conventional bimetallic thermometer, a resistance thermometer or a thermocouple. The sensor is in circuit with a triple pole double throw switch 28, a timer 30 and an alarm 32. Switch 28 is movable between so called "ON" and "OFF" positions. When the switch is in the ON position, the line from the sensor terminating at contact "a" is connected to contact "b" which in turn is connected to the line which runs from the switch to the timer, the alarm and a source 34 of electrical energy. The energy source is preferably a rechargeable battery and is independent of the power supply for the cooler so that an interruption in the power to the cooler will not affect the operation of the circuit which activates the alarm.

Alarm 32 may be a bell, a siren or other audible, visual or both audible and visual means for providing a warning to a farmer. Timer 30 serves as a time delay means for delaying the activation of the alarm for a predetermined interval of time after switch 28 is moved to the ON position. That interval of time will be sufficient for the cooler to reduce the temperature of the milk to the required temperature. A suitable timer for this purpose is a solid state adjustable time relay manufactured by Syracuse Electronics Corporation of Syracuse, N.Y. and identified by model number SJS/D-7A2573.

When switch 28 is in the ON position, the circuit in which warning lamp 36 is connected is completed. That lamp indicates that the switch is closed and is preferably mounted on the main control panel. Also mounted on the control panel is push button switch 38 which activates alarm 32 when switch 28 is the ON position. Switch 38 is biased open by a spring or other means so that the alarm is not activated unless the switch is pressed. By means of the push button switch, alarm 32 can be tested to ensure that it is operating properly.

Optionally, switch 28 may serve as the ON OFF switch for the cooler in which case the circuit which activates the cooling coils 14 of the cooler is activated by electrical interconnection of contacts c,d of the switch.

When switch 28 is in the OFF position, contacts e,f are electrically interconnected. Those contacts are in circuit 39 which is energized when a milking machine indicated generally 40 is operating. By milking machine is meant a machine of conventional construction for causing milk to flow from one or more cows through a series of conduits to cooler 10.

When circuit 39 is energized and switch 28 is in the OFF position, alarm 32 will be activated. The alarm will remain activated as long as switch 28 is in the OFF position. Moving the switch to the ON position will deactivate the alarm.

OPERATION OF THE APPARATUS

Activation of the thus described warning system is accomplished when switch 28 is moved to the ON position thereby completing the circuit which includes the temperature sensor 26 and the alarm 32. That switch is normally turned ON at the time fresh milk is being introduced into the cooler. Timer 30 is set to delay the operation of the alarm for a time sufficient for the cooler to cool the milk to the required 4 degrees C. Once that interval of time has elapsed, the alarm will sound should the temperature of the milk within the cooler exceed that value.

At the time that the milk is to be discharged from the cooler, the operator moves switch 28 to the OFF position in order to deactivate the alarm. The milk is then dicharged and the operator may scour the cooler with hot cleaning solvent without activation of the alarm.

Following cleaning of the cooler, the operator again moves switch 28 to the ON position to reactivate the alarm in preparation for the introduction of fresh milk into the cooler. Should the operator fail to do so however, alarm 32 will sound as soon as the operator switches the milking machine on. This is because circuit 39 in which alarm 32 is connected is completed by switch 28 in the OFF position and by activation of milking machine 40.

Thus the alarm will warn the operator of a failure of the cooler whenever the cooler contains milk. The alarm can be turned off to prevent it from sounding when the cooler is empty or when it is being scoured with to cleaning solvent. However when the milking machine is activated and fresh milk is introduced into the cooler the alarm will sound to warn the operator to move switch 28 to the ON position. As soon as the switch is moved to this position, timer 30 begins its timing cycle and until it is complete prevents alarm 32 from sounding.

Lamp 20 warns the operator that the agitator is not operating. Milk in a cooler must be continually agitated or stirred while the cooler is operating to prevent the build-up of a ice. The ice can form a layer which may coat the cooling coils and prevent or delay the cooling of fresh milk added to the cooler. The ice may also form over the outlet of the cooler and make it impossible to empty the tank.

Lamp 25 warns the operator that he has forgotten to close the outlet valve of the cooler.

The warning device of the invention therefore contains three alarms means: the first being alarm 32 which warns that the cooler is malfunctioning or that switch 28 is in the OFF position. The second alarm means is lamp 20 which warns that the agitator has stopped and the third alarm means is lamp 25 which warns that the milk is discharging from the cooler.

As indicated above, alarm 32 carries out two functions, it is a warning means to the farmer that the cooler is malfunctioning and it is a warning means that switch 28 is OFF or is de-activated. When the alarm performs the latter function is is responsive to activation of the milking machine and to de-activation of switch 28. Thus the switch when moved to the OFF position de-activates the alarm but that switch is overridden and the alarm sounds when the milking machine activates.

It will be understood of course that modifications can be made in the preferred embodiment described herein without departing from the scope and purview of the invention as defined in the appended claims.

What I claim as new and desire to protect by Letters Patent of the United States is:

1. A temperature warning device for use in conjunction with a milking machine and a cooler in which the milking machine causes milk to flow from one or more cows to the cooler where the temperature of the milk is cooled to a predetermined value, said warning device comprising: temperature sensor means responsive to the temperature of milk within the cooler; alarm means activated by said sensor means when the temperature of the milk within the cooler is above a predetermined value; means for selectively deactivating said alarm means; and warning means responsive to activation of said milking machine and to de-activation of said alarm means for warning of de-activation of said alarm means.

2. A temperature warning device for use in conjunction with a milking machine and a cooler in which the milking machine causes milk to flow from one or more cows to the cooler where the temperature of the milk is cooled to a predetermined value, said warning device comprising: temperature sensor means responsive to the temperature of milk within the cooler; alarm means activated by said sensor means when the temperature of the milk within the cooler is above a predetermined value; means for selectively deactivating said alarm means; and overriding means responsive to activation of said milking machine and to de-activation of said alarm means for overriding said de-activation means and for causing said alarm means to activate.

3. A temperature warning device for use in conjunction with a milking machine and a cooler in which the milking machine causes milk to flow from one or more cows to the cooler where the temperature of the milk is cooled to a predetermined value, said warning device comprising: temperature sensor means responsive to by said sensor means when the temperature of the milk within the cooler is above a predetermined value; switch means for deactivating said alarm means; and switch overriding means responsive to activation of said milking machine and to de-activation of said alarm means for overriding said de-activation means and for causing said alarm means to activate.

4. The warning device as claimed in claim 1 further including time delay means for delaying the operation of said alarm means for a predetermined interval of time after said deactivating means is moved to an activating position.

5. The warning device as claimed in claim 1, further including an agitator for agitating the milk within the cooler; stop motion detecting means for detecting the stoppage of the agitator; and second alarm means activated by said stop motion detecting means upon de-activation of said agitator.

6. The warning device as claimed in claim 1, further including: third alarm means; and flow detecting means for detecting the flow of liquid from said cooler and for activating said third alarm.

7. The warning device as claimed in claim 2 further including time delay means for delaying the operation of said alarm means for a predetermined interval of time after said deactivating means is moved to an activating position.

8. The warning device as claimed in claim 2 further including an agitator for agitating the milk within the cooler; stop motion detecting means for detecting the stoppage of the agitator; and second alarm means activated by said stop motion detecting means upon de-activation of said agitator.

9. The warning device as claimed in claim 3 further including an agitator for agitating the milk within the cooler; stop motion detecting means for detecting the stoppage of the agitator; and second alarm means activated by said stop motion detecting means upon de-activation of said agitator.

10. The warning device as claimed in claim 2 further including: third alarm means; and flow detecting means for detecting the flow of liquid from said cooler and for activating said third alarm.

11. The warning device as claimed in claim 3 further including: third alarm means; and flow detecting means for detecting the flow of liquid from said cooler and for activating said third alarm.

* * * * *